United States Patent [19]

Maynard

[11] 4,369,958

[45] Jan. 25, 1983

[54] ROTATING TABLE POSITIONING DEVICE WITH MINIMUM BACKLASH

[75] Inventor: Robert A. Maynard, Holland, N.Y.

[73] Assignee: Airco, Inc., Montvale, N.J.

[21] Appl. No.: 207,572

[22] Filed: Nov. 17, 1980

[51] Int. Cl.³ .............................................. B23Q 3/18
[52] U.S. Cl. ..................................... 269/61; 269/74; 409/168; 409/224
[58] Field of Search ........................... 269/61, 74, 57; 74/813 L, 825; 409/164, 168, 224; 403/273

[56] References Cited

U.S. PATENT DOCUMENTS 2,445,016  6/1948  Bently .
3,039,766  6/1962  Aronson ............................... 269/61
3,514,090  7/1967  Wuesthoff .

OTHER PUBLICATIONS

Twin Gearbox Drive Ass'y., Eng. Drawing No. 9944-1418, Aronson Machine Co., 3-29-79.
Brake Disc & Trunnion Ass'y, Eng. Drawing No. 9932-0044, Aronson Machine Co. 4/15/75.
Ring Feeder, Eng. Drawing No. 9940-0473, Aronson Machine Co., 3-29-79.
Trunnion Rotation Ass'y Eng. Drawing No. 9942-1000, Aronson Machine Co., 8-29-79.
Rt. Side Spiral Mitre Gearbox Ass'y, Eng. Drawing No. 9942-1002, Aronson Machine Co., 7-31-79.
Mitre-Worm Gearbox Ass'y, Eng. Drawing No. 9942-1004, Aronson Machine Co., 7-27-79.
Catalog Bulletin GP68, Aronson Machine Co., Arcade, New York.

*Primary Examiner*—Robert C. Watson
*Attorney, Agent, or Firm*—Larry R. Cassett; David A. Draegert

[57] ABSTRACT

A motor-driven rotating table positioning device has a bullgear engaged by two pinions each driven by the high-efficiency worm and gear set. These two worm and gear sets are connected by a coupling shaft and an adjustable coupling which allows a desired torsion to be maintained in the coupling shaft thereby eliminating any table backlash caused by the bullgear, pinions and high-efficiency worm and gear sets. For safety in the event of motor failure, the motor is coupled to the coupling shaft by a low-efficiency or self-locking worm and gear set.

10 Claims, 3 Drawing Figures

ROTATING TABLE POSITIONING DEVICE WITH MINIMUM BACKLASH

FIELD OF THE INVENTION

The invention relates to a workpiece positioning device of the motor-driven, rotating table type.

Many manufacturing and other operations involve supporting a workpiece or other article in a particular orientation and sequentially reorienting the workpiece. Such positioning of a workpiece is particularly important in fabricating articles by electric arc welding because the speed and quality of the welding process is greatly dependent upon the relative orientation of the electrode and the workpiece. In many cases, the workpiece is heavy and asymetrical and must be rotated about an axis tilted from the vertical. The positioning device must be capable of providing stable support in all orientations and of making quick changes between positions.

The torque required to rotate a workpiece depends upon its weight and the radial distance of its center of gravity from the rotational axis. Rotating table positioning devices are commercially available with capacities ranging from $10^3$ to $10^7$ ft-lbs of rotational torque.

The increasing use of welding robots requires positioning devices which can be programmed to assume a series of precise orientations with a minimum of mechanical backlash.

DESCRIPTION OF THE PRIOR ART

Motor-driven, rotating table positioning devices have been under development for many years. A first design employed a pinion and a durable, large diameter gear, called a bullgear, fixed to the table. For safety in the event of motor failure, the pinion and the motor were coupled by a worm and gear unit of a type in which the worm can easily drive the gear in either direction, but the gear is incapable or, at least very inefficient, in driving the worm. Such a worm and gear set is said to have low-efficiency or to be self-locking because it resists being back-driven by a load coupled to the gear. In this first design, the table rotation related to backlash was controlled by an adjustable friction-brake on a second pinion which also engaged the bullgear. The friction-brake required frequent, painstaking adjustment and wasted up to one-half of the motor torque. This first design made large capacity positioning devices possible but they were very expensive.

A second design employed two pinions, each driven by a separate worm and gear set of the self-locking type. The worms were mounted on concentric shafts, each having a sprocket. The parallel sprockets were coupled by a chain, each link of which simultaneously engaged both sprockets. The amount of backlash could be adjusted in increments by removing the chain, rotating one sprocket and replacing the chain. Fortunately, such time-consuming adjustment was necessary only infrequently. The second design was improved by replacing the chain-sprocket coupling with a continuously adjustable coupling. With pinion-bullgear reduction ratios of 8:1 to 12:1, reasonably small backlash could only be obtained by using worm and gear sets having large reduction ratios, such as about 72:1. Still further reduction in backlash was essential before rotating table positioning devices could be used with modern, computer-controlled welding robots.

A third design replaced each of the self-locking worm and gear sets of the second design with a set of two bevel gears. One bevel gear of each set was mounted on the same shaft with each of the pinions. The remaining two bevel gears were mounted on concentric shafts which were connected by a coupling shaft and a continuously adjustable coupling. A set of bevel gears can be driven easily in either direction by either gear. When the concentric shafts were rotated in one direction, the bevel gear sets allowed one pinion to drive the bullgear in one direction while the other pinion dragged. When the concentric shafts were rotated in the opposite direction, the direction of bullgear rotation and the functions of the pinion were reversed. Safety was insured by using a self-locking worm and gear set to couple the motor to the concentric shafts of the bevel gear sets.

In the third design, the bullgear, the two pinions, the two sets of bevel gears, the coupling shaft and the adjustable coupling form a closed loop. By twisting the concentric wormshafts in opposite directions to provide torsion in the coupling shaft, it was possible to totally eliminate backlash in the closed loop.

Despite the improvements of the third design, it was found deficient in several particulars. First, even small capacity positioners required large and costly bevel gears in order to have an appropriate margin of safety, and large capacity machines were not feasible. Second, although backlash in the closed loop could be eliminated, some backlash related rotation of the table was unavoidable because of the backlash inherent in the self-locking worm and gear set. With a typical worm and gear set having a reduction ratio of 72:1 and a backlash of 0.008 in., and bevel gear and pinion-bullgear sets having reduction ratios of 1:1 and 12:1, respectively, the backlash related rotation of the table was 0.4 minutes of arc. The table motion could be reduced by using bevel gears or spur gears having a greater reduction ratio, but again, this would greatly increase their cost and make large capacity positioning devices impractical.

The invention is an improved design which overcomes the disadvantages of the prior designs and enables safe rotation of heavy, eccentrically mounted workpieces with high precision and reasonable cost.

SUMMARY OF THE INVENTION

The invention is a positioning device of the motor-driven, rotating table type. The device comprises a bullgear fixed to the table and engaged by two pinions, each of which is driven by one of a pair of matched worm and gear sets. Contrary to the worm and gear sets of prior designs, each of these matched sets is of a type in which the gear can drive the worm with high-efficiency, i.e. the worm and gear set can be easily back-driven by a load coupled to the gear. These worm and gear sets are connected by a coupling shaft and a continuously adjustable coupling which allow one pinion to be twisted against the other to obtain a desired torsion in the coupling shaft. The table is selectively rotated in either direction by a motor which is coupled to the coupling shaft by a worm and gear set of the self-locking type. In preferred embodiments, the positioning device also includes a means for adjustably tilting the rotational axis of the table at an angle to the vertical.

The self-locking worm and gear set enables the invention to safely handle a heavy, eccentrically mounted load even when the table is tilted. The table motion related to backlash in the self-locking worm and gear set is reduced by the reduction ratio of the high efficiency worm and gear sets and, in addition, the reduction in the pinion-bullgear sets.

The adjustable torsion in the coupling shaft controls table rotation related to backlash and eliminates any backlash due to the bullgear, the pinions, or the two high efficiency worm and gear sets. This feature is important because it is very difficult and expensive to fabricate pinions and, particularly, bullgears which maintain positive engagement in all positions. The torsional spring effect maintains positive engagement despite the imperfections in the gears and, thus, allows use of much less costly components.

The worm and gear sets occupy little space and can be made strong and durable at a reasonable cost. The design can easily be adapted for loads of a wide range of sizes and weights. Even very large rotational capacity positioners are feasible.

DESCRIPTION OF THE PREFERRED EMBODIMENT

Figure 1:
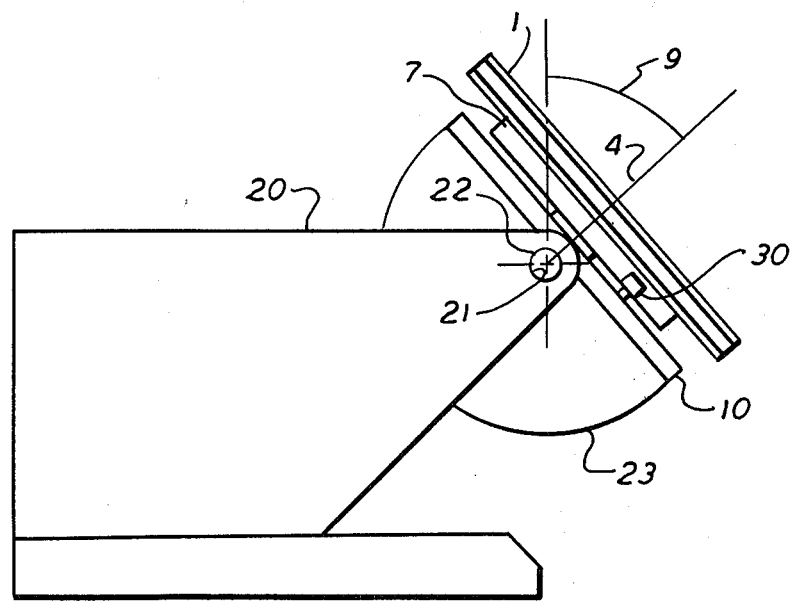
FIG. 1 is an end view of a tilting and rotating table positioning device incorporating the invention.

FIG. 1 illustrates a tilting and rotating table positioning device. A table 1 is mounted on a frame 10 for rotation about a rotational axis 4. The table is rotated by a bullgear 7 and a pair of motor-driven pinions, one of which is 30. The frame 10 is fitted with trunnions 21 which are mounted in bearings 22 of a support structure 20 to allow the frame 10 and table 1 to rotate together about a tilt axis. Tilt gear sectors 23 mounted to the ends of the frame 10 are engaged by motor driven pinions (not shown) to enable adjustment of the tilt enagle 9 between the vertical and the rotational axis 4.

Figure 2:
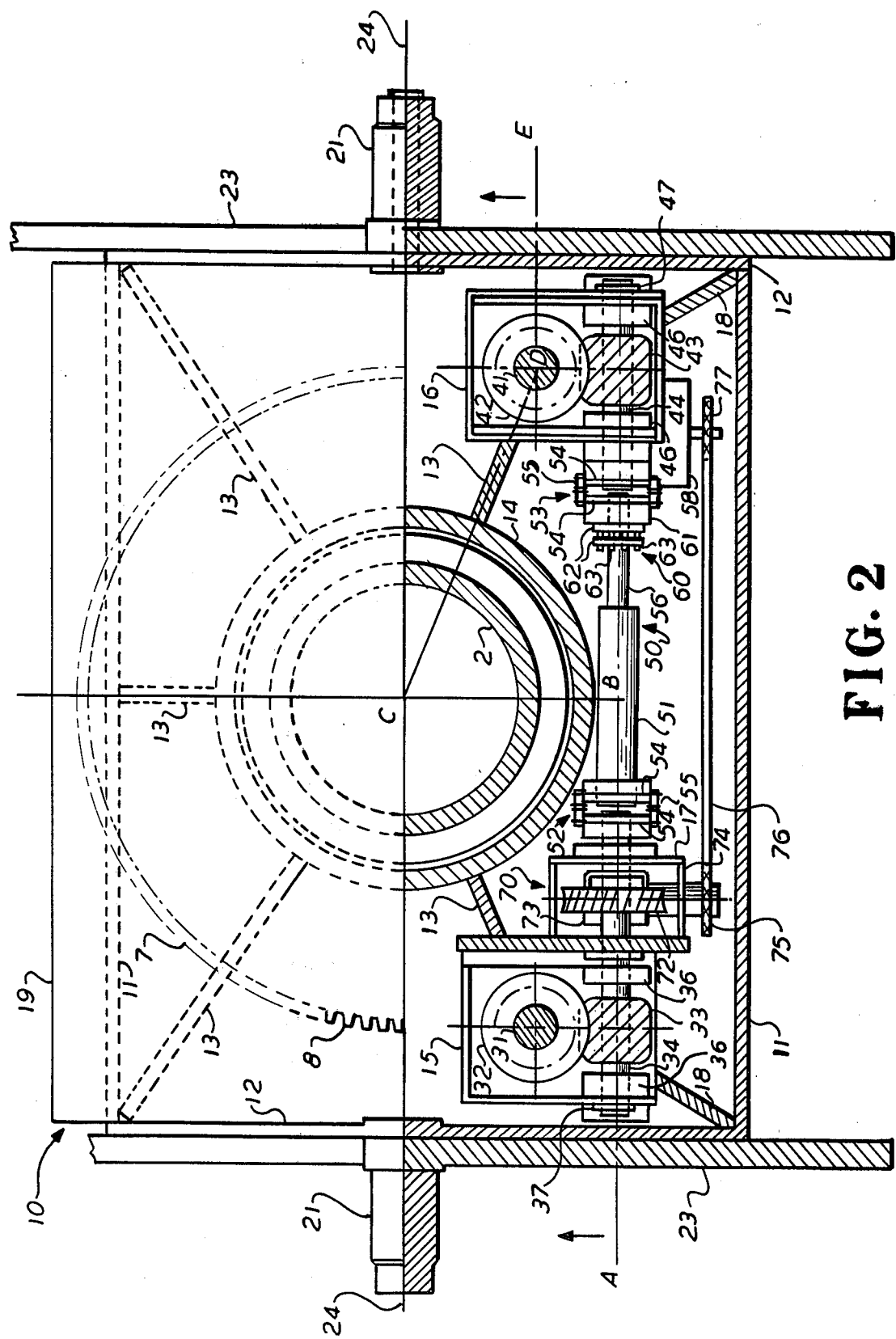
FIG. 2 is a plan view, partially in cross-section, of the positioning device of FIG. 1.
Figure 3:
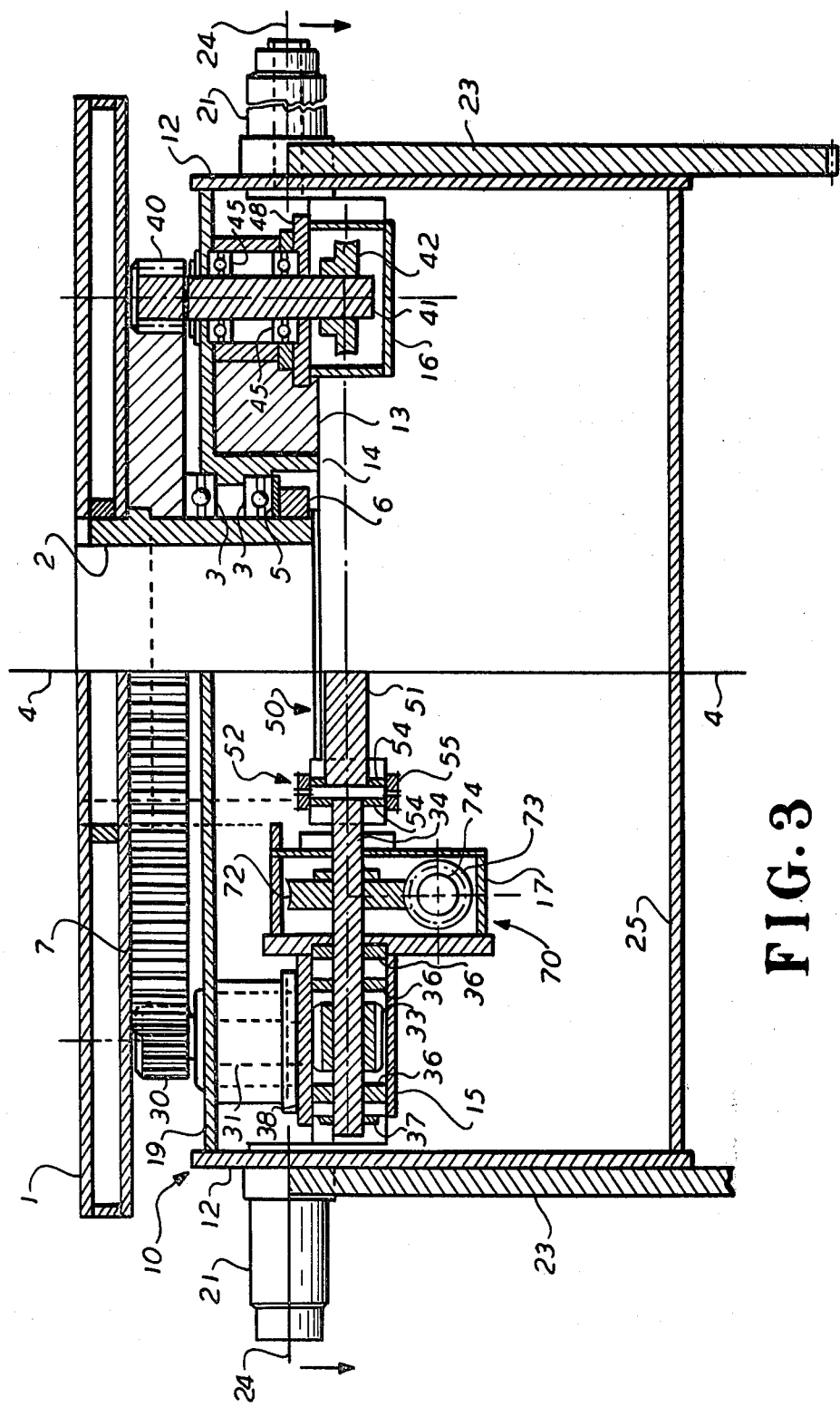
FIG. 3 is a side view, partially in cross-section, of the positioning device of FIG. 1.

FIGS. 2 and 3 illustrate the detailed construction of the positioning device of FIG. 1. FIG. 2 is a plan view of the rotating table mechanism of the positioning device viewed along the rotational axis 4 with the table 1 removed. One half of the device is shown in cross-section along a plane containing the tilt axis 24 but with the tops 38 and 48 of the gear boxes 15 and 16 removed. FIG. 3 is a side view in cross-section along the line ABCDE of FIG. 2.

The table 1 is fitted with an axle 2 which is mounted in cup and cone roller bearings 3 for rotation about the rotational axis 4. The bearings are adjusted by means of a washer 5 and a locking nut 6.

A rectangular frame 10 supports the rotating table 1. The frame comprises a top 19, bottom 25, two sides 11, two ends 12, and a number of radial braces 13 connecting the sides and ends with a cylinder 14 which supports the table bearings 3. The frame also comprises three gear boxes 15, 16 and 17 for supporting three worm and gear sets. These gear boxes are supported on the frame by additional braces 18. A trunnion 21 and a tilt gear sector 23 are fixed to each end 12 of the frame.

The bullgear 7 is fixed to the underside of the table 1. The bullgear has teeth around its outer circumference 8 which engage a first pinion 30 and a second pinion 40. The first pinion 30 is mounted on the same shaft 31 with a wormgear 32 which is engaged by a worm 33 mounted on wormshaft 34. Similarly, the second pinion 40 is mounted on the same shaft 41 with a wormgear 42 which is engaged by a worm 43 mounted on a wormshaft 44. The pinion shafts 31 and 41 are mounted for rotation in suitable bearings, such as roller bearings 45. Similarly, wormshafts 34 and 44 are mounted in bearings 36 and 46, respectively, which may be of either the ball or roller type. Translations of wormshafts 34 and 44 are restrained by locking nuts 37 and 47, respectively.

The first and second worm and gear sets, 33-32 and 43-42, are of the high-efficiency type wherein the gear can easily drive the worm in either direction. Worms 33, 43 having at least four threads are preferred. These forward- and back-driving worm and gear sets are quite unlike the self-locking worm and gear sets which have been used heretofore on rotating table positioners. Each worm and gear set provides a right angle drive so that the two worm shafts 34 and 44 can be concentric, even though the two pinion shafts 31 and 41 are parallel.

The two wormshafts 34 and 44 are connected by a coupling shaft 51 to form a connected shaft 50. Wormshaft 34 is connected to shaft 51 by a chain and sprocket coupling 52 comprising two sprockets 54, one fixed to an end of shaft 34 and the other fixed to the adjacent end of shaft 51. The coaxial sprockets are connected by a chain 55 each link of which engages both of the sprockets. The wormshaft 44 is connected to the other end 56 of coupling shaft 51 by a similar chain and sprocket coupling 53 and by an adjustable coupling 60.

The chain and sprocket couplings 52 and 53 compensate for minor misalignments of the connected shafts 34, 44 and 51. The adjustable coupling 60 is preferably continuously adjustable to allow the shafts 44 and 51 to be rotated in opposite directions and then locked together at any point desired.

The preferred adjustable coupling 60 is a shrink disc connection, such as is manufactured by the Ringfedder Corporation, Westwood, New Jersey. This coupling comprises an inner ring, a pair of locking collars 62, all of which surround an extension of a hub 61 which in turn surrounds one end 56 of the coupling shaft 51. The collars 62 are separated by an O-ring and connected by a number of screws 63. The inner edges of the collars are tapered in opposite directions and co-act with a double taper on the inner ring. By tightening the screws 63, the locking collars 62 are pulled together exerting radial forces on the inner ring and hub 61 and establishing positive frictional connection between the hub 61 and the shaft 51. One of the sprockets 54 of coupling 53 is fixed to the hub 61, and the other sprocket 54 is fixed to wormshaft 44.

During assembly, one end of the coupling shaft 51 is fixed to the first wormshaft 34 by the coupling 52 and twisted so that the first pinion 30 tends to rotate the bullgear 7 in one direction. At the same time, the other concentric wormshaft 44 is twisted in the opposite direction so that the second pinion 40 tends to rotate the bullgear in the opposite direction. After the shafts are wound up to the desired torsion, the torsion is maintained by locking the adjustable coupling 60.

The connected shaft 50 is rotated by a third worm and gear set comprising a gear 72 mounted on the first wormshaft 34. This gear 72 is engaged by a third worm 73 and together they form a worm and gear set 70 of the low-efficiency or self-locking type. Preferably, the worm 73 has a single thread. The worm is mounted for rotation in suitable bearings and is driven by a sprocket 75 mounted on the third wormshaft 74. The sprocket 75 is coupled by a timing belt or chain 76 to another sprocket 77 driven by a motor 78. When the motor drives in one direction, the first pinion drives the bullgear and the table in a first direction against the drag imposed by the second pinion. When the motor drives in the opposite direction, the functions of the pinions are reversed and the second pinion drives the table and bullgear in the opposite direction against the drag imposed by the first pinion.

The bullgear 7, two pinions 30 and 40, first and second worm and gear sets, 33-32 and 43-42, and the connected shaft 50 form a closed loop. Allowance for imperfections and tooth wear in any of the gears of the closed loop is made by adjustment of the coupling 60 to obtain the desired torsion.

For a positioning device having a rotational torque capacity of 3,000 ft-lbs, the preferred design includes a variable speed electric motor which is capable of 3 ft-lbs of torque and of one horsepower at 1750 revolutions per minute. The coupling between the motor and third wormshaft is 1:1. The reduction ratio of the third worm and gear set is 24:1, and the reduction ratio of the first and second worm and gear sets is 6:1. The reduction ratio of the pinion-bullgear set is 12:1. Thus, the overall reduction ratio from the motor to the table is 1724:1. Thus, the table is easily rotated at convenient speeds in the range 0.5 to 1 revolutions per minute.

A backlash of 0.008 in. is typical for a self-locking worm and gear set having a reduction ratio of 24:1. The backlash of the entire device as measured by turntable rotation can be reduced to less than 0.2 minutes of arc by the use of high-efficiency worm and gear sets and pinion-bullgear sets having a total reduction ratio of at least 72:1.

Other reduction ratios are, of course, possible. Preferably, the reduction ratio of the third worm and gear set is in the range 24:1 to 72:1, and the combined reduction ratio of each of the first or second worm and gear sets and a pinion-bullgear set is in the range 60:1 to 80:1. In order to avoid excessively large and small gears, the preferred range for the reduction ratio of the high-efficiency worm and gear sets is 6:1 to 18:1, and that of the pinion-bullgear sets is 8:1 to 12:1. The overall reduction ratio from motor to turntable is preferably in the range 1700:1 to 3400:1.

In the preferred embodiment of FIGS. 1-3, the table is 3 ft square and the bullgear has a diameter of 2 ft. The table can be rotated about axis 4 to any desired position and can be tilted about axis 24 to any desired angle 9 in the range 0° to 135°. Positioners having larger or smaller tables and rotational torque capacities are possible.

The invention has been described in terms of a preferred embodiment which is a tilting and rotating table positioning device. The invention can also be incorporated into other positioning devices such as a head-stock positioner wherein the rotational axis is horizontal, or a turntable positioner wherein the rotational axis is vertical.

What is claimed is:

1. A positioning device for rotating an eccentrically mounted load comprising:
   (a) a frame;
   (b) a table supported by the frame and mounted for rotation about an axis;
   (c) a bullgear fixed to the table for rotating the table;
   (d) first and second pinions engaging the bullgear;
   (e) a first gear set coupled to the first pinion and comprising a first worm and first gear wherein the first gear is capable of driving the first worm and the first worm is capable of driving the first gear;
   (f) a second gear set coupled to the second pinion and comprising a second worm and second gear wherein the second gear is capable of driving the second worm and the second worm is capable of driving the second gear;
   (g) a coupling shaft;
   (h) an adjustable coupling; wherein the first gear set, the coupling shaft, the adjustable coupling and the second gear set are coupled so that the coupling shaft is under torsion which drives the first and second pinions so as to tend to rotate the bullgear in opposite directions;
   (i) a third gear set comprising a self-locking third worm and third gear wherein the third gear is coupled to the coupling shaft;
   (j) a motor for selectively rotating the third worm and thereby rotating the table.

2. The positioning device of claim 1, further comprising: a means for tilting the rotational axis of the table to an adjustable angle to the vertical.

3. The positioning device of claim 1, wherein the first and second worms each have four threads.

4. The positioning device of claim 1, wherein the third worm has no more than one thread.

5. The positioning device of claim 1, wherein the reduction ratio of each of the first and second gear sets is in the range 6:1 to 18:1.

6. The positioning device of claim 5, wherein the reduction ratio of the third gear set is in the range 24:1 to 72:1; and the combined reduction ratio of each of the first and second gear sets and of each pinion with the bullgear is in the range 60:1 to 80:1.

7. The positioning device of claim 1, wherein the reduction ratio from the motor to the turntable is in the range 1700:1 to 3400:1.

8. The positioning device of claim 1, wherein the adjustable coupling is a continuously adjustable coupling.

9. The positioning device of claim 8, wherein the shaft coupling comprises a shrink-disc connection.

10. The positioning device of claim 8, wherein the first and second worms have four threads, the third worm has no more than one thread, the reduction ratio of the pinion-bullgear sets is at least 8:1, the reduction ratios of each of the first and second gear sets is at least 6:1, the reduction ratio of the third gear set is at least 24:1, the first worm, the second worm and the coupling shaft are coaxial; and further comprising, a means for tilting the rotational axis of the table to an adjustable angle to the vertical.

* * * * *